United States Patent
Kirkpatrick et al.

(10) Patent No.: US 7,206,515 B2
(45) Date of Patent: Apr. 17, 2007

(54) SINGLE-ENDED/DIFFERENTIAL WIRED RADIO FREQUENCY INTERFACE

(76) Inventors: Peter E. Kirkpatrick, 1710 Martin Luther King Jr. Way, Apt. A, Berkeley, CA (US) 94209; Thomas Mader, 16251 Azalen Way, Los Gatos, CA (US) 95032

( * ) Notice: Subject to any disclaimer, the term of this patent is extended or adjusted under 35 U.S.C. 154(b) by 680 days.

(21) Appl. No.: 10/209,520

(22) Filed: Jul. 30, 2002

(65) Prior Publication Data

US 2004/0208592 A1    Oct. 21, 2004

(51) Int. Cl.
*H04B 10/00* (2006.01)

(52) U.S. Cl. .................. 398/117; 398/115; 398/116; 398/128; 398/135; 398/139; 398/163; 398/164; 398/140; 398/141; 398/182; 398/202; 257/664; 257/690; 257/692; 257/693; 455/78; 455/570; 455/250; 385/14; 385/16; 385/88; 385/89; 385/92; 385/93

(58) Field of Classification Search ............... 398/115, 398/116, 117, 128, 135, 139, 163, 164, 140, 398/182, 141, 202; 257/664, 690, 692, 693; 455/78, 570, 250; 385/14, 92, 93, 16, 88, 385/89

See application file for complete search history.

(56) References Cited

U.S. PATENT DOCUMENTS

| | | | |
|---|---|---|---|
| 5,493,437 A | 2/1996 | Lebby et al. | |
| 6,452,254 B2 * | 9/2002 | Bosch et al. | 257/664 |
| 6,485,192 B1 | 11/2002 | Plotts et al. | |
| 6,647,039 B2 | 11/2003 | Fu et al. | |
| 7,027,790 B2 * | 4/2006 | Westra et al. | 455/250.1 |
| 7,076,123 B2 * | 7/2006 | Kirkpatrick et al. | 385/14 |
| 2002/0140092 A1 | 10/2002 | Nakanishi et al. | |
| 2002/0168152 A1 | 11/2002 | Abe et al. | |
| 2003/0108110 A1 * | 6/2003 | Harres | 375/259 |
| 2003/0113118 A1 * | 6/2003 | Bartur | 398/139 |
| 2003/0142929 A1 | 7/2003 | Bartur et al. | |
| 2003/0206703 A1 | 11/2003 | Chiu et al. | |

* cited by examiner

*Primary Examiner*—Hanh Phan
(74) *Attorney, Agent, or Firm*—Kevin A. Reif

(57) ABSTRACT

A package to encapsulate an optical component includes a RF interface to receive high frequency signals from an external source. The RF interface pins that can be configured as one or more single-ended transmission lines or as one or more differential transmission lines. For example, the RF interface includes four pins that can be coupled in one of two configurations to provide a single-ended transmission line and in a third configuration to provide a differential transmission line. In one embodiment, the first, second, and fourth pins are coupled to ground while the second pin is coupled to receive a RF signal. Alternatively, the first, second and fourth pins are coupled to ground and the third pin is coupled to receive a RF signal. For a differential transmission line, the first and fourth pins are coupled to ground while the second and third pins are coupled to receive a differential RF signal.

25 Claims, 4 Drawing Sheets

SINGLE-ENDED/DIFFERENTIAL WIRED RADIO FREQUENCY INTERFACE

TECHNICAL FIELD

The invention relates to optoelectronic packaging. More specifically, the invention relates to an optoelectronic component package having a wired radio frequency (e.g., 9 kHz to 300 GHz) interface that is configurable as either a single-ended interface or as a differential interface.

BACKGROUND

Optical devices communicating over optical fibers provide higher bandwidth communications than electrical signaling over wires. However, because most data generation and/or manipulation occurs in the electrical domain, in order to take advantage of the bandwidth provided by optical communications, devices are required to transfer signals between the electrical domain to the optical domain. Various devices exist to convert electrical signals to optical signals and from optical signals to electrical signals are known.

In order to take advantage of the high bandwidth provided by optical signals, electrical signals are typically provided to packages containing optical devices at high frequencies. These signals are typically radio frequency (RF) signals in the range between 9 kHz and 300 GHz. These high frequency signals can cause the physical interface (e.g., package leads) between the packages and other devices (e.g., printed circuit boards) to operate as transmission lines. Communication using transmission lines requires more complex design than for a physical interface transmitting signals at lower frequencies.

Because the RF interface design is more complex than traditional, electrical-only packages, the design time and cost associated with package design are increased. For each packaged component providing different functionality a custom RF interface may be required, which increases the cost and complexity of component design.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Radio frequency (e.g., 9 kHz to 300 GHz) interfaces that are configurable as either a single-ended interface or as a differential interface are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

A package to encapsulate an optical component (e.g., photodetector, laser diode) includes a wired RF interface to pass high frequency signals to or from an external source (e.g., a printed circuit board). In one embodiment, the RF interface includes a set of pins that can be configured as one or more single-ended transmission lines or as one or more differential transmission lines. In one embodiment, the RF interface includes multiple pins including four pins (pins one, two, three and four) that can be coupled in one of two configurations to provide a single-ended transmission line and in a third configuration to provide a differential transmission line. In one embodiment, pins one, three, and four are coupled to ground and pin two is coupled to receive a RF signal to provide a single-ended interface, with pin three being specifically coupled to the coplanar ground between pins two and three. Alternatively, pins one, two and four are coupled to ground and pin three is coupled to receive a RF signal to provide a single-ended interface, with pin two being specifically coupled to the coplanar ground between pins two and three. To provide a differential transmission line, pins one and four are coupled to ground and pins two and three are coupled to receive a differential RF signal.

Figure 1:
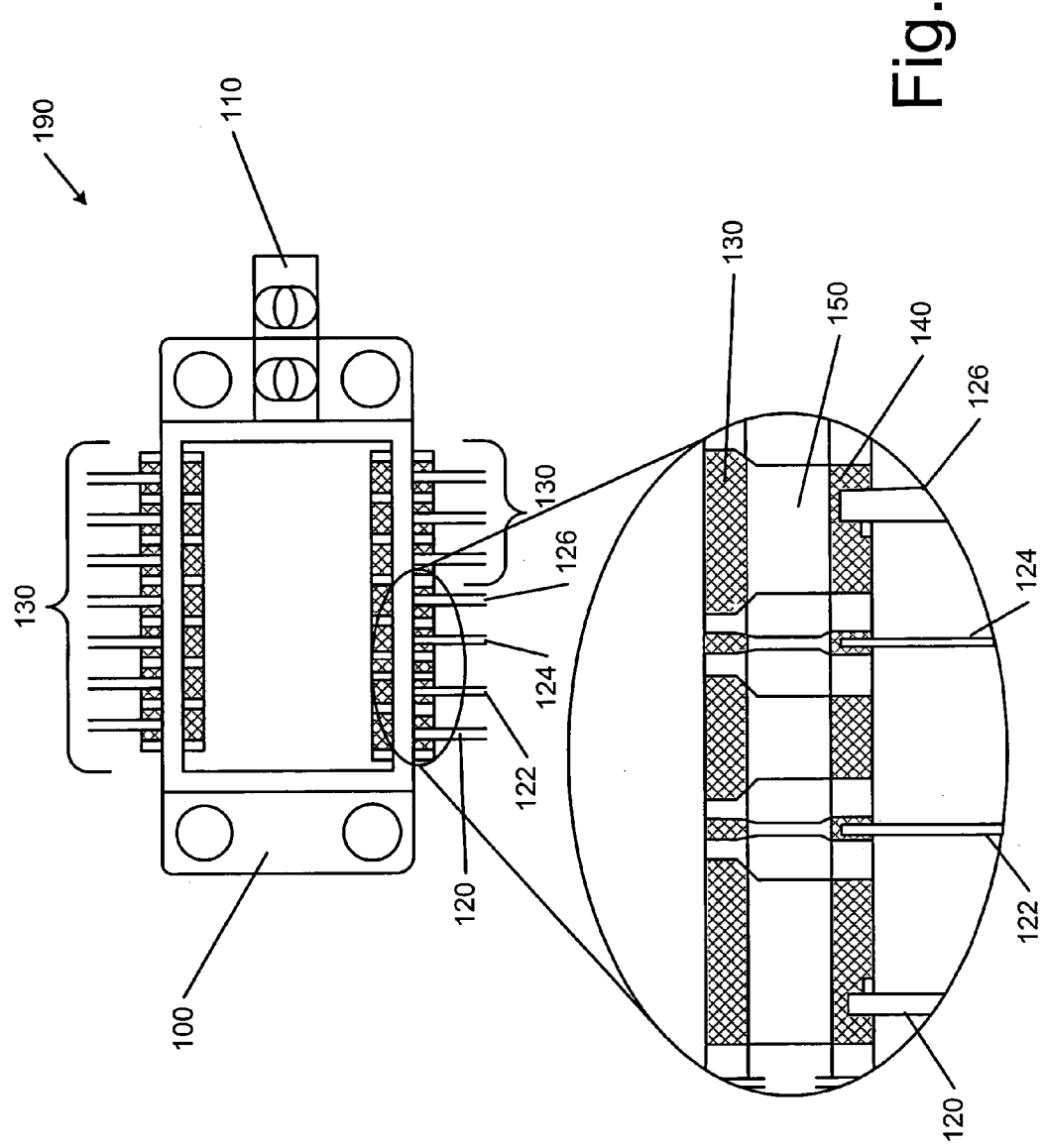
FIG. 1 illustrates one embodiment of a package for an optical component with an exploded view of one embodiment of a configurable wired RF interface.

FIG. 1 illustrates one embodiment of a package for an optical component with an exploded view of one embodiment of a configurable RF interface. Substrate 100 can be any type of substrate known in the art appropriate for use with optical packaging to provide support for components within package 190. Passthrough 110 provides a portal through which an optical fiber can pass to carry optical signals to/from a device within package 190.

Pins/leads 130 provide an interface through which electrical signals are passed into and/or out of package 190. While package 190 is described as having a single RF interface, package 190 can be configured to have any number of RF interfaces, either configurable as described herein or non-configurable.

In one embodiment, the configurable RF interface includes pins 120, 122, 124 and 126. To provide a single-ended transmission line interface, pins 120, 122 and 126 are coupled to ground and pin 124 is coupled to receive the RF signal. In an alternate single-ended embodiment, pins 120, 124 and 128 are coupled to ground and pin 122 is coupled to receive the RF signal.

To provide a differential transmission line interface, pins 120 and 126 are coupled to ground and pins 122 and 124 are coupled to receive a differential RF signal.

In one embodiment, pins coupled with ground are coupled both externally and internally to ground. Grounding the pins both internally and externally provides performance improvements over grounding the pins only internally or externally by reducing parasitic inductance caused by the signals passing through metal layers of package 190. If the increased performance is not desired, pins can be grounded either internally or externally.

In one embodiment, the single-ended interface is a 50 Ohm Ground-Signal-Ground (GSG) interface and the differential interface is a 100 Ohm Ground-Signal-Signal-Ground (GSSG) interface. In alternative embodiments, other impedances can be provided. Using the interface of FIG. 1, a single package design can provide a single-ended RF interface or a differential RF interface with the same set of pins.

Regions 130, 140, and 150 all show a metalized area on one layer of ceramic. The region that is not hatched (150) indicates where there is an additional layer of ceramic above. This upper layer allows the transmission line to pass through the package wall. Other layers and/or packaging can also be used.

Figure 2:
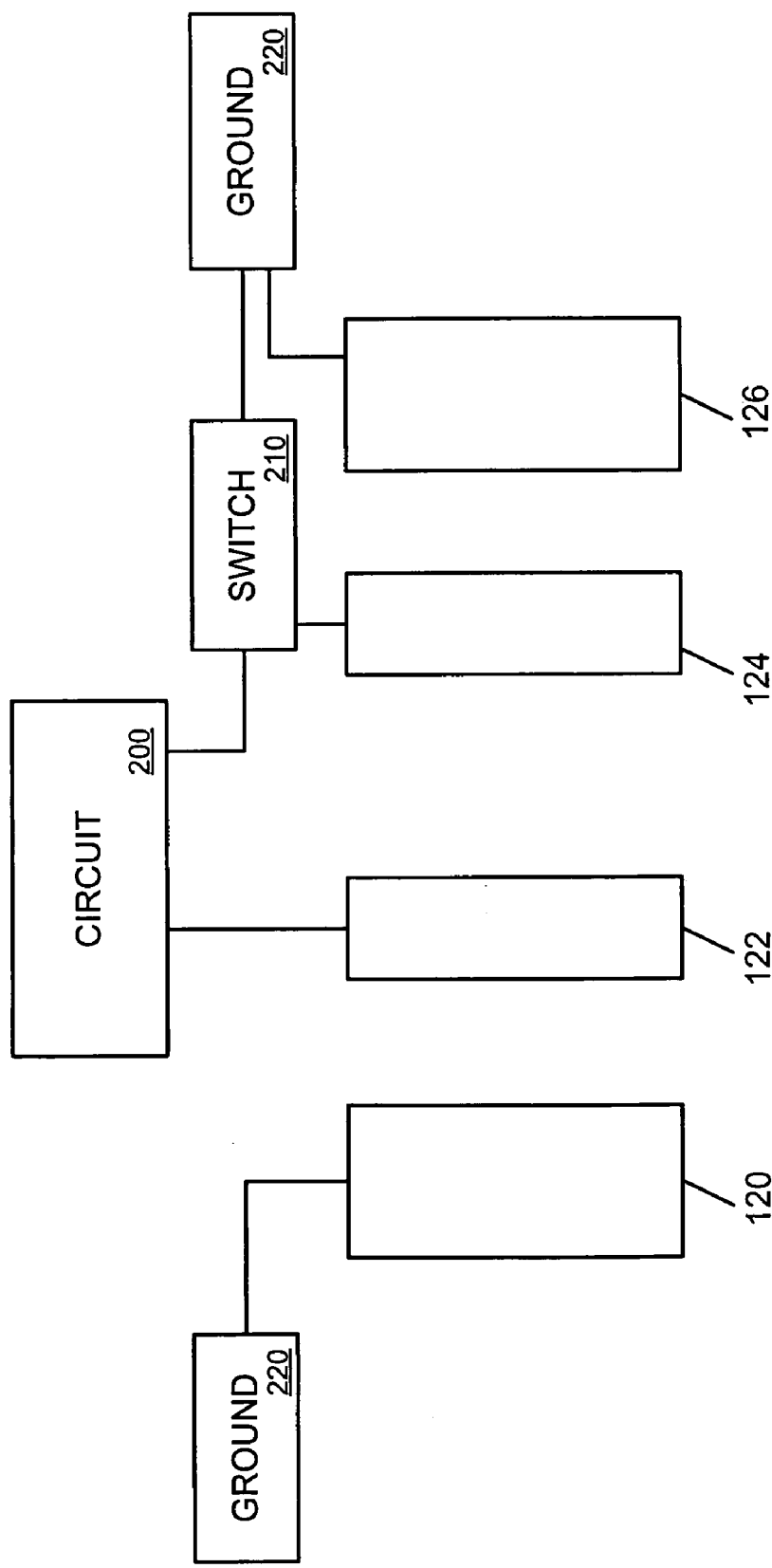
FIG. 2 is a block diagram of one embodiment of a dynamically configurable wired RF interface.

FIG. 2 is a block diagram of one embodiment of a dynamically configurable wired RF interface. The RF interface of FIG. 2 provides the same functionality as the RF interface of FIG. 1 except that the interface of FIG. 2 provides a switch to allow dynamic configuration of the interface.

Circuit 200 receives signals from pin 122 and/or pin 124. Circuit 200 can, for example, provide conversion functionality between electrical and optical signals. In one embodiment, circuit 200 is coupled with pin 124 through switch 210, which is also coupled with ground 220. Ground 220 can be a ground plane within an optoelectronic package or any other connection that provides ground to one or more components of the package.

Switch 210 selectively couples pin 124 to circuit 200 or to ground 220. When the interface of FIG. 2 operates as a single-ended interface, circuit 200 receives signals from pin 122 and pin 124 is coupled with ground 220 through switch 210. When the interface operates as a differential interface, circuit 200 receives signals from both pins 122 and 124.

In one embodiment, switch 210 is controlled by circuit 200 (control connection not shown in FIG. 2). In an alternative embodiment, switch is coupled with a control circuit (not shown in FIG. 2) that provides control signals to switch 210 to control the state of switch 210. In another alternative embodiment, switch 210 is controlled by a by an external device (not shown in FIG. 2).

Figure 3:
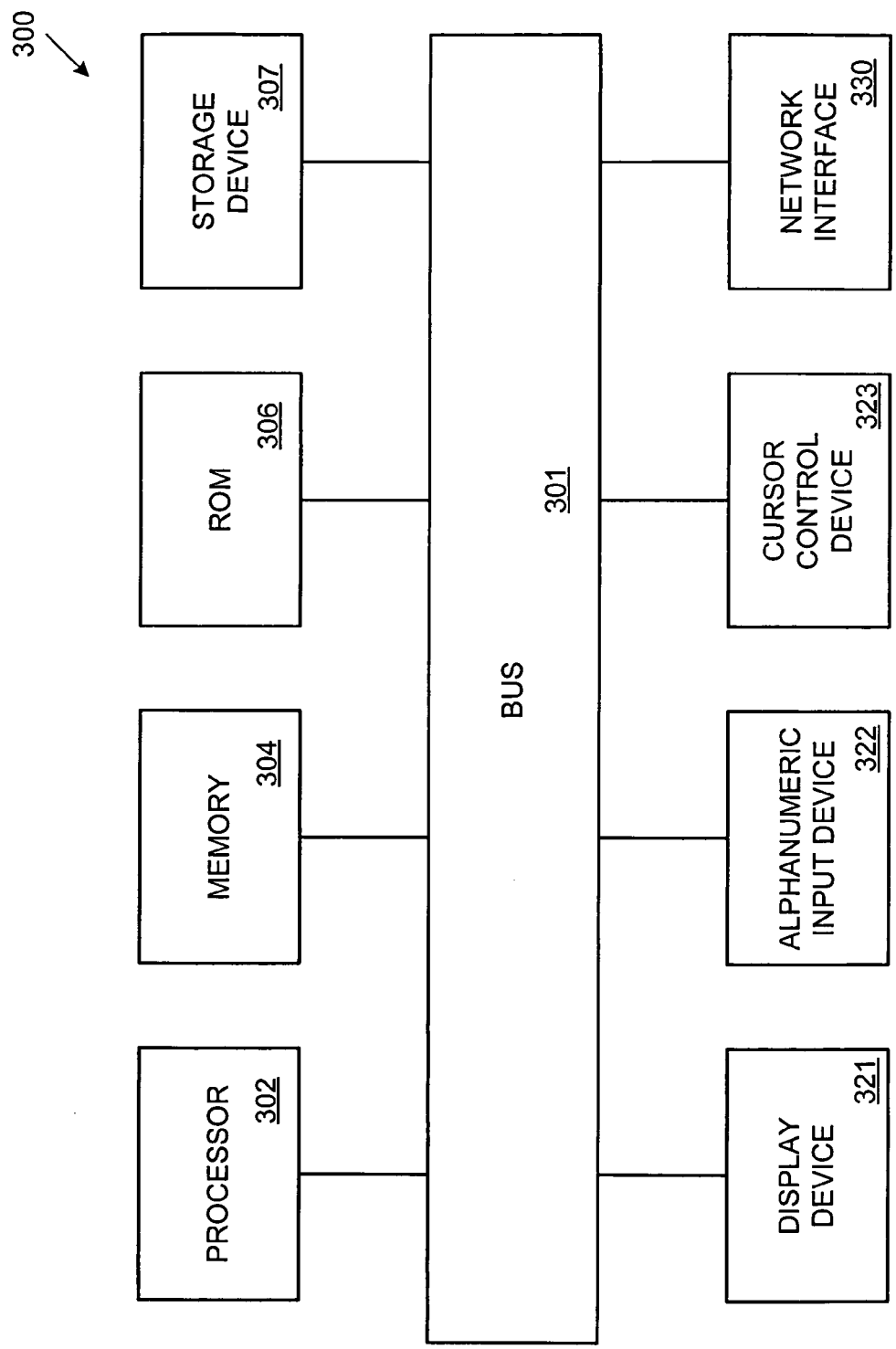
FIG. 3 is one embodiment of an electronic system.

FIG. 3 is a block diagram of one embodiment of an electronic system. The electronic system illustrated in FIG. 3 is intended to represent a range of electronic systems, for example, computer systems, network access devices, etc. Alternative systems, whether electronic or non-electronic, can include more, fewer and/or different components.

Electronic system 300 includes bus 301 or other communication device to communicate information, and processor 302 coupled to bus 301 to process information. In one embodiment, one or more lines of bus 301 are optical fibers that carry optical signals between components of electronic system 300. One or more of the components of electronic system 300 having optical transmission and/or optical reception functionality can include the configurable RF interface described above.

While electronic system 300 is illustrated with a single processor, electronic system 300 can include multiple processors and/or co-processors. Electronic system 300 further includes random access memory (RAM) or other dynamic storage device 304 (referred to as memory), coupled to bus 301 to store information and instructions to be executed by processor 302. Memory 304 also can be used to store temporary variables or other intermediate information during execution of instructions by processor 302.

Electronic system 300 also includes read only memory (ROM) and/or other static storage device 306 coupled to bus 301 to store static information and instructions for processor 302. Data storage device 307 is coupled to bus 301 to store information and instructions. Data storage device 307 such as a magnetic disk or optical disc and corresponding drive can be coupled to electronic system 300.

Electronic system 300 can also be coupled via bus 301 to display device 321, such as a cathode ray tube (CRT) or liquid crystal display (LCD), to display information to a computer user. Alphanumeric input device 322, including alphanumeric and other keys, is typically coupled to bus 301 to communicate information and command selections to processor 302. Another type of user input device is cursor control 323, such as a mouse, a trackball, or cursor direction keys to communicate direction information and command selections to processor 302 and to control cursor movement on display 321. Electronic system 300 further includes network interface 330 to provide access to a network, such as a local area network. In one embodiment, network interface 330 provides an interface to an optical network by including an optical transmitter and/or receiver in a package having an interface described in greater detail above.

Figure 4:
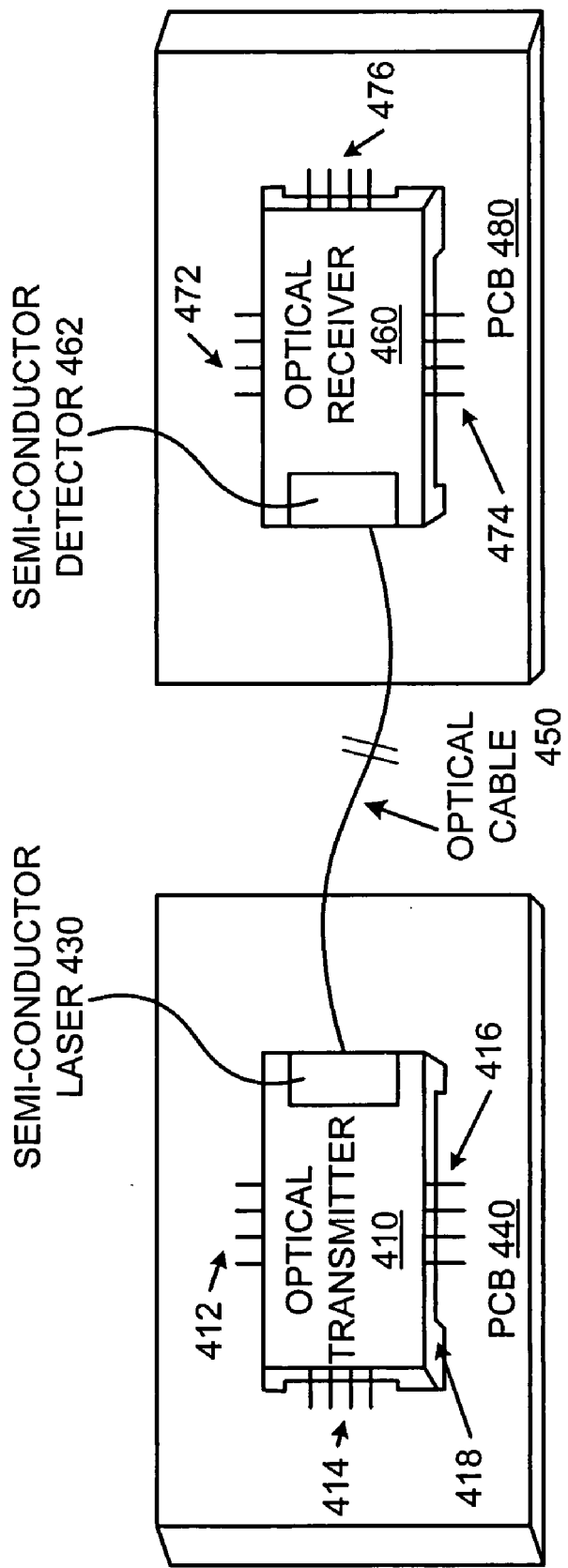
FIG. 4 illustrates one embodiment of an optical electronic network.

FIG. 4 illustrates one embodiment of an optical electronic network. System 400 includes optical transmitter 410 which is, for example, the transmitter described above in a package having a configurable RF interface. Optical transmitter 410 is coupled to printed circuit board 440 by leads 412, 414 and 416. Optical package 418 is configured as a transmitter, which includes semiconductor laser 430. Optical transmitter 410 communicates via semiconductor laser 430, while transmitting optical signals via optical cable 450. The optical signals are received by optical receiver 460.

Optical receiver 460 includes leads 472, 474 and 476 to form an electrical connection to PCB 480. In order to receive optical signals, optical receiver 460 includes a semiconductor detector 462. Semiconductor detector 462 receives an optical signal from optical cable 450 and converts the optical signal into its original electrical signal format. Signals can be transmitted to PCB 470 using a configurable RF interface.

Other applications are numerous and include, for example, transponders and line cards. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   a dynamically configurable interface having a plurality of pins wherein when the plurality of pins is coupled in a first configuration the interface operates as a single-ended transmission line interface and when the plurality of pins is coupled in a second configuration the interface operates as a differential transmission line interface; and
   a switch coupled with a selected pin of the plurality of pins to couple the selected pin with ground to configure the inter-face as a single-ended transmission line interface and to couple the selected pin to carry a signal to configure the interface as a differential transmission line interface.

2. The apparatus of claim 1 wherein the plurality of pins comprises a first pin, a second pin, a third pin and a fourth pin.

3. The apparatus of claim 2 wherein the second configuration comprises the first pin coupled with ground, the second and third pins coupled to communicate a differential signal and the fourth pin coupled with ground.

4. The apparatus of claim 3 wherein the first configuration comprises the first pin coupled with ground, the second pin coupled to communicate a signal, the third pin is coupled with ground, and the fourth pin is coupled with ground.

5. The apparatus of claim 3 wherein the first configuration comprises the first pin coupled with ground, the second pin coupled with ground, the third pin is coupled to communicate a signal, and the fourth pin is coupled with ground.

6. The apparatus of claim 5 further comprising a switch coupled between the third pin and an optical component to selectively coupled the second pin to ground.

7. The apparatus of claim 1 further comprising an optical communications component coupled with the plurality of pins of the interface.

8. The apparatus of claim 7 wherein the optical communications component comprises an optical transmission component.

9. The apparatus of claim 7 wherein the optical communications component comprises an optical signal detector.

10. The apparatus of claim 1 further comprising a switch coupled with one of the plurality of pins to selectively couple the pin to ground for the first configuration and to selectively coupled the pin to a circuit component for the second configuration.

11. An optical package comprising:
a plurality of lead pins including pins to provide a dynamically configurable radio frequency (RF) interface between electrical signal sources external to the package and components within the package, wherein when the pins of the RF interface are coupled in a first configuration to operate as a single-ended transmission line interface and in a second configuration to operate as a differential transmission line interface;
a switch coupled with a selected pin of the plurality of pins to couple the selected pin with ground to configure the interface as a single-ended transmission line interface and to couple the selected pin to carry a signal to configure the interface as a differential transmission line interface; and
an optical device to communicate using optical signals coupled with the RF interface, the optical device having conversion circuitry to convert between optical signals and electrical signals.

12. The apparatus of claim 11 wherein the plurality of pins comprises a first pin, a second pin, a third pin and a fourth pin.

13. The apparatus of claim 12 wherein the second configuration comprises the first pin coupled with ground, the second and third pins coupled to communicate a differential signal and the fourth pin coupled with ground.

14. The apparatus of claim 13 wherein the first configuration comprises the first pin coupled with ground, the second pin coupled to communicate a signal, the third pin is coupled with ground, and the fourth pin is coupled with ground.

15. The apparatus of claim 14 further comprising a switch coupled between the second pin and the optical device to selectively coupled the second pin to ground.

16. The apparatus of claim 13 wherein the first configuration comprises the first pin coupled with ground, the second pin coupled with ground, the third pin is coupled to communicate a signal, and the fourth pin is coupled with ground.

17. The apparatus of claim 11 wherein the optical communications component comprises an optical transmission component.

18. The apparatus of claim 11 wherein the optical communications component comprises an optical signal detector.

19. The apparatus of claim 11 further comprising a switch coupled with one of the plurality of pins to selectively couple the pin to ground for the first configuration and to selectively coupled the pin to a circuit component for the second configuration.

20. A system comprising:
a packaged transmitting device having an optical component to transmit optical signals, a plurality of lead pins including pins to provide a dynamically configurable radio frequency (RF) interface between electrical signal sources external to the package and components within the package, wherein when the pins of the RF interface are coupled in a first configuration to operate as a single-ended transmission line interface and in a second configuration to operate as a differential transmission line interface, and a switch coupled with a selected pin of the plurality of pins to couple the selected pin with ground to configure the interface as a single-ended transmission line interface and to couple the selected pin to carry a signal to configure the interface as a differential transmission line interface;
an optical communications medium to carry signals transmitted by the optical component of the transmitting device; and
a receiving device coupled with the optical communications medium to receive signals transmitted by the transmitting device.

21. The system of claim 20 wherein the receiving device further comprises a plurality of lead pins including pins to provide a radio frequency (RF) interface between electrical signal sources external to the package and components within the package, wherein when the pins of the RF interface are coupled in a first configuration to operate as a single-ended transmission line interface and in a second configuration to operate as a differential transmission line interface.

22. The system of claim 20 wherein the transmitting device is a processor and the receiving device is a memory.

23. A system comprising:
a transmitting device having an optical component to transmit optical signals;
an optical communications medium to carry signals transmitted by the optical component of the transmitting device; and
a packaged receiving device coupled with the optical communications medium to receive signals transmitted by the transmitting device having a plurality of lead pins including pins to provide a dynamically configurable radio frequency (RF) interface between electrical signal sources external to the package and components within the package, wherein when the pins of the RF interface are coupled in a first configuration to operate as a single-ended transmission line interface and in a second configuration to operate as a differential transmission line interface, and a switch coupled with a selected pin of the plurality of pins to couple the selected pin with ground to configure the interface as a single-ended transmission line interface and to couple the selected pin to carry a signal to configure the interface as a differential transmission line interface.

24. The system of claim 23 wherein the transmitting device further comprises a plurality of lead pins including pins to provide a radio frequency (RF) interface between electrical signal sources external to the package and components within the package, wherein when the pins of the RF interface are coupled in a first configuration to operate as a single-ended transmission line interface and in a second configuration to operate as a differential transmission line interface.

25. The system of claim 23 wherein the transmitting device is a processor and the receiving device is a memory.

* * * * *